(12) United States Patent
Milde, Jr.

(10) Patent No.: US 9,399,493 B1
(45) Date of Patent: Jul. 26, 2016

(54) WINDSHIELD AIR DEFLECTOR FOR A MOTOR VEHICLE

(71) Applicant: Karl F. Milde, Jr., Mahopac, NY (US)

(72) Inventor: Karl F. Milde, Jr., Mahopac, NY (US)

( * ) Notice: Subject to any disclaimer, the term of this patent is extended or adjusted under 35 U.S.C. 154(b) by 0 days.

(21) Appl. No.: 14/679,270

(22) Filed: Apr. 6, 2015

Related U.S. Application Data

(60) Provisional application No. 62/136,672, filed on Mar. 23, 2015.

(51) Int. Cl.
*B62D 35/00* (2006.01)
*B62D 25/12* (2006.01)

(52) U.S. Cl.
CPC .............. *B62D 35/005* (2013.01); *B62D 25/12* (2013.01)

(58) Field of Classification Search
CPC .......... B60J 1/20; B60J 1/2002; B60J 1/2005; B62D 35/00; B62D 35/005; B62D 37/02; B62D 25/12
USPC ............. 296/180.1–180.5, 181.5, 193.11, 91; 180/903; D12/181, 182
See application file for complete search history.

(56) References Cited

U.S. PATENT DOCUMENTS

| | | | | |
|---|---|---|---|---|
| 2,112,709 A * | 3/1938 | Reynolds | ............... | B60J 1/2005 296/91 |
| 2,184,798 A * | 12/1939 | Gracey | ................... | B60J 1/2005 296/91 |
| 2,243,029 A * | 5/1941 | Cupit | ..................... | B60J 1/2005 296/91 |
| 2,757,954 A * | 8/1956 | Hurley | ................... | B60J 1/2005 296/91 |
| 2,823,072 A * | 2/1958 | Podolan | ................. | B60J 1/2005 180/69.2 |
| 3,574,392 A * | 4/1971 | Hirano | .................. | B60S 1/0463 296/91 |
| 3,695,674 A * | 10/1972 | Baker | .................. | B62D 35/005 296/180.1 |
| 3,791,468 A * | 2/1974 | Bryan, Jr. | ............... | B62D 37/02 105/1.3 |
| 4,040,656 A * | 8/1977 | Clenet | .................... | B60J 1/2005 296/91 |
| 4,043,587 A * | 8/1977 | Giallourakis | .......... | B60J 1/2005 296/91 |
| 4,063,773 A * | 12/1977 | Modesette | ............. | B60J 1/2005 296/91 |

(Continued)

*Primary Examiner* — Gregory Blankenship
(74) *Attorney, Agent, or Firm* — Karl F. Milde, Jr.

(57) ABSTRACT

An air deflector device configured for mounting on the hood of a motor vehicle adjacent a windshield for deflecting air away from the windshield as the vehicle moves rapidly forward. This deflector device comprises an elongate deflector member configured to be mounted substantially horizontally on the hood of the vehicle, transverse to its central, longitudinal axis (the deflector member having a forward edge and a rearward edge when so mounted); and a hinge on the forward edge of the deflector member to enable the rearward edge of the member to be raised and lowered in front of the windshield. A drive or spring bias mechanism may also be provided to raise and lower the member between a first position in which it is substantially parallel (e.g., flush) with the surface of the hood and a second position, with the rearward edge raised, in which the member deflects air upwards and away from the windshield.

9 Claims, 4 Drawing Sheets

(56) References Cited

U.S. PATENT DOCUMENTS

| | | | | |
|---|---|---|---|---|
| 4,142,758 | A | 3/1979 | Scaife | |
| 4,158,466 | A | 6/1979 | Ramsay | |
| 4,262,954 | A * | 4/1981 | Thompson | B62D 35/005 105/1.2 |
| 4,379,582 | A * | 4/1983 | Miwa | B62D 35/005 293/113 |
| 4,810,022 | A * | 3/1989 | Takagi | B62D 35/005 180/197 |
| 4,929,013 | A | 5/1990 | Eke | |
| 5,052,745 | A * | 10/1991 | Preiss | B60J 7/22 296/180.5 |
| 5,054,844 | A * | 10/1991 | Miwa | B62D 35/005 280/848 |
| 5,114,205 | A * | 5/1992 | Jee | B60J 1/2002 296/152 |
| 5,630,640 | A * | 5/1997 | Fior | B60J 7/22 296/91 |
| 5,743,589 | A * | 4/1998 | Felker | B62D 35/007 296/180.1 |
| 5,924,756 | A * | 7/1999 | Homa | B62D 35/005 296/180.1 |
| 6,068,328 | A * | 5/2000 | Gazdzinski | B62D 35/00 244/203 |
| 6,086,146 | A * | 7/2000 | Nabuurs | B60J 7/22 296/180.1 |
| 6,109,565 | A * | 8/2000 | King, Sr. | B64C 3/141 244/12.1 |
| 6,183,041 | B1 * | 2/2001 | Wilson | B60J 1/20 296/180.1 |
| 6,431,639 | B2 * | 8/2002 | Yoon | 296/180.1 |
| 6,926,346 | B1 * | 8/2005 | Wong | B62D 35/001 296/180.1 |
| 8,128,037 | B2 * | 3/2012 | Powell | B64C 21/08 244/130 |
| 8,864,214 | B2 | 10/2014 | AlgÜEra Gallego | |
| 2001/0040383 | A1 * | 11/2001 | Lund | B60J 1/2005 296/95.1 |
| 2003/0090126 | A1 * | 5/2003 | Adams | B62D 35/007 296/180.1 |
| 2004/0026954 | A1 * | 2/2004 | Neel | B60J 1/2002 296/95.1 |
| 2005/0017541 | A1 * | 1/2005 | Jungert | B62D 35/005 296/180.1 |
| 2007/0034746 | A1 * | 2/2007 | Shmilovich | B64C 9/16 244/207 |
| 2008/0018134 | A1 * | 1/2008 | Schreiber | B60Q 1/0017 296/180.5 |
| 2010/0327624 | A1 * | 12/2010 | Wetzels | B60J 7/22 296/180.1 |
| 2012/0056038 | A1 * | 3/2012 | Grip | B64C 9/16 244/213 |
| 2012/0068020 | A1 * | 3/2012 | Milde, Jr. | B64C 21/04 244/207 |
| 2013/0106135 | A1 * | 5/2013 | Praskovsky | B62D 35/001 296/180.1 |
| 2013/0168999 | A1 * | 7/2013 | Hitchcock | B62D 35/00 296/180.1 |
| 2014/0175831 | A1 * | 6/2014 | Hoelzel | B62D 35/005 296/180.5 |
| 2014/0252800 | A1 * | 9/2014 | D'Arcy | B62D 35/005 296/180.5 |
| 2015/0102634 | A1 * | 4/2015 | Bauer | B60J 7/223 296/180.1 |
| 2016/0023693 | A1 * | 1/2016 | Wolf | B62D 25/2072 296/180.5 |

* cited by examiner

WINDSHIELD AIR DEFLECTOR FOR A MOTOR VEHICLE

CROSS-REFERENCE TO RELATED APPLICATION

This application claims priority from U.S. Provisional Application No. 62/136,672, filed Mar. 23, 2015.

BACKGROUND OF THE INVENTION

Motor vehicles (cars and trucks) use energy to travel, mostly to overcome friction between the tires and the road and air friction with the body of the vehicle, but also to push air out of the vehicles' way as it moves forward.

Vehicle bodies have been made increasingly aerodynamic to reduce the force required to push them rapidly forward through the air, but there are inherent limitations to what can be done in this regard. Such limitations are due to the practical requirements of providing an adequate interior space in the vehicle for occupants and providing an adequate view forward for the driver.

A major obstacle to aerodynamic design is the vehicle windshield. The glass plate forming this part of the vehicle cannot be slanted much more than about 45 degrees to the vertical or the view of the road ahead becomes distorted.

As a result, the rate of energy consumption of the vehicle, measured in miles per gallon of fuel consumed, increases as the speed of the vehicle is increased beyond a given cruising speed.

According to studies backed by the U.S. Department of Energy, the fuel consumption of the average car peaks at about 55 MPH. As the speed increases beyond 55 MPH the vehicle is:

3% less efficient at 60 mph,
 8% less efficient at 65 mph,
 17% less efficient at 70 mph,
 23% less efficient at 75 mph, and
 28% less efficient at 80 mph.

At such higher speeds the vehicles waste gas and create unnecessary greenhouse gases.

SUMMARY OF THE INVENTION

The principal objective of the present invention is to provide a means to reduce the fuel consumption of a motor vehicle when it travels at elevated (superhighway) speeds.

This objective, as well as other objectives which will become apparent from the discussion that follows, are achieved, according to the invention, by providing an air deflector in front of the windshield that may be retracted when travelling at low and moderate speeds (e.g. below about 60 MPH).

More particularly, the present invention provides an air deflector device configured for mounting on the hood of a motor vehicle adjacent a windshield for deflecting air away from the windshield as the vehicle moves forward. This deflector device comprises:

(a) an elongate deflector member configured to be mounted substantially horizontally on the hood of the vehicle, transverse to its central, longitudinal axis (the deflector member having a forward edge and a rearward edge when so mounted); and
(b) a hinge on the forward edge of the deflector member to enable the rearward edge of the member to be raised and lowered in front of the windshield.

When raised, the deflector member serves to deflect air upward and away from the windshield of the vehicle.

Advantageously, the deflector device further comprises: a powered drive mechanism connected to the deflector member which is operative to raise and lower the member between a first position in which it is substantially parallel (e.g. flush) with the surface of the hood and a second position, with the rearward edge raised, in which the member deflects air upward away from the windshield.

Alternatively, the device may comprise spring means connected to the deflector member that biases the member toward the first position and allows the member to be raised by airflow over its upper surface to the second position when the vehicle travels at an elevated speed.

The air deflector device according to the invention may be factory installed on the front hood of a motor vehicle directly in front of the vehicle windshield. In this case, the hood is advantageously provided with a recess, and the deflector member and hinge are accommodated in the recess to enhance the appearance of the vehicle.

Alternatively, the air deflector device may be designed for retrofit onto a motor vehicle. In this case, the device includes a hold member connected to the hinge at each end of the deflector member for attachment of the air deflector device to a hood of the vehicle.

In a particularly preferred embodiment of the invention the deflector member includes a plurality of individual members hinged together, longitudinal edge-to-longitudinal edge, to comprise an articulated deflector member that forms a curved upper surface when the rearward edge is raised.

In another preferred embodiment of the invention the upper surface of the deflector member facing away from a hood of a motor vehicle has at least one opening therein for the egress of air. An air blower and an air pipe are provided for directing forced air to this deflector member for egress through the opening(s). This arrangement enhances the lateral flow of air over the upper surface.

For a full understanding of the present invention, reference should now be made to the following detailed description of the preferred embodiments of the invention as illustrated in the accompanying drawings.

DESCRIPTION OF THE PREFERRED EMBODIMENTS

The preferred embodiments of the present invention will now be described with reference to FIGS. 1-6 of the drawings.

Figure 1A:
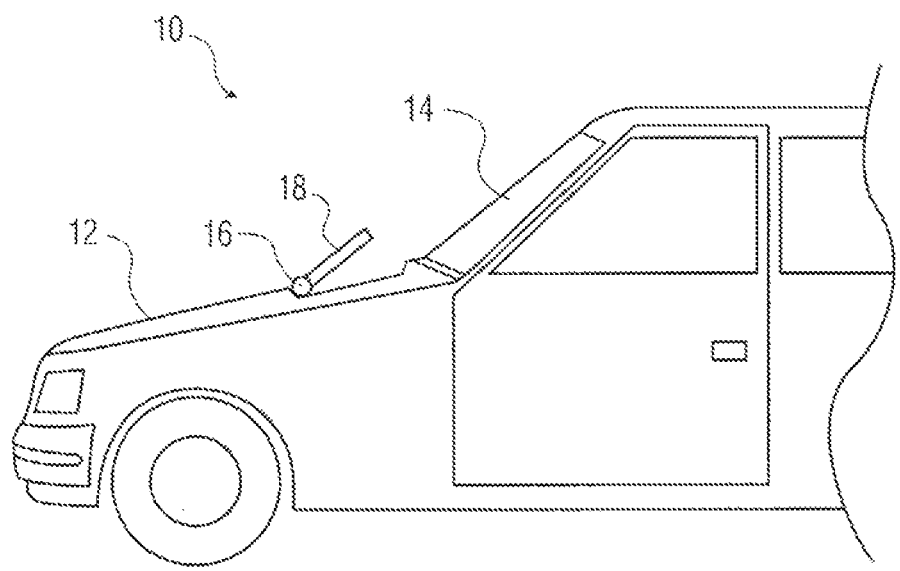
FIG. 1A is a side view of a motor vehicle on which is mounted a deflector device according to the present invention.

As shown in the accompanying FIG. 1A, an air deflector device is provided on the front hood 12 of the motor vehicle 10 to guide air away from the windshield 14 when the vehicle travels forward at relatively high speeds. The deflector device comprises a deflector member 18 of about three feet to six feet in length, so that it can extend over a substantial portion of the width of the hood. The member 18 is preferably from about three inches to about one foot in width.

The deflector member 18 is positioned out of the way of the windshield washer outlets 16 on the hood 12.

Figure 1B:
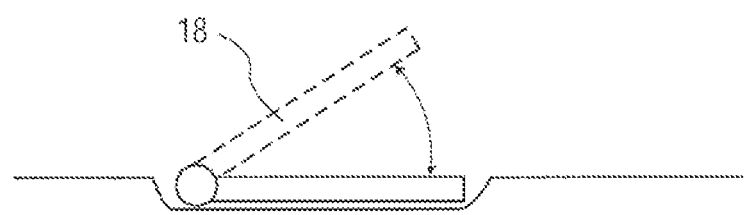
FIG. 1B is a detailed view of the deflector device of FIG. 1.
Figure 2:
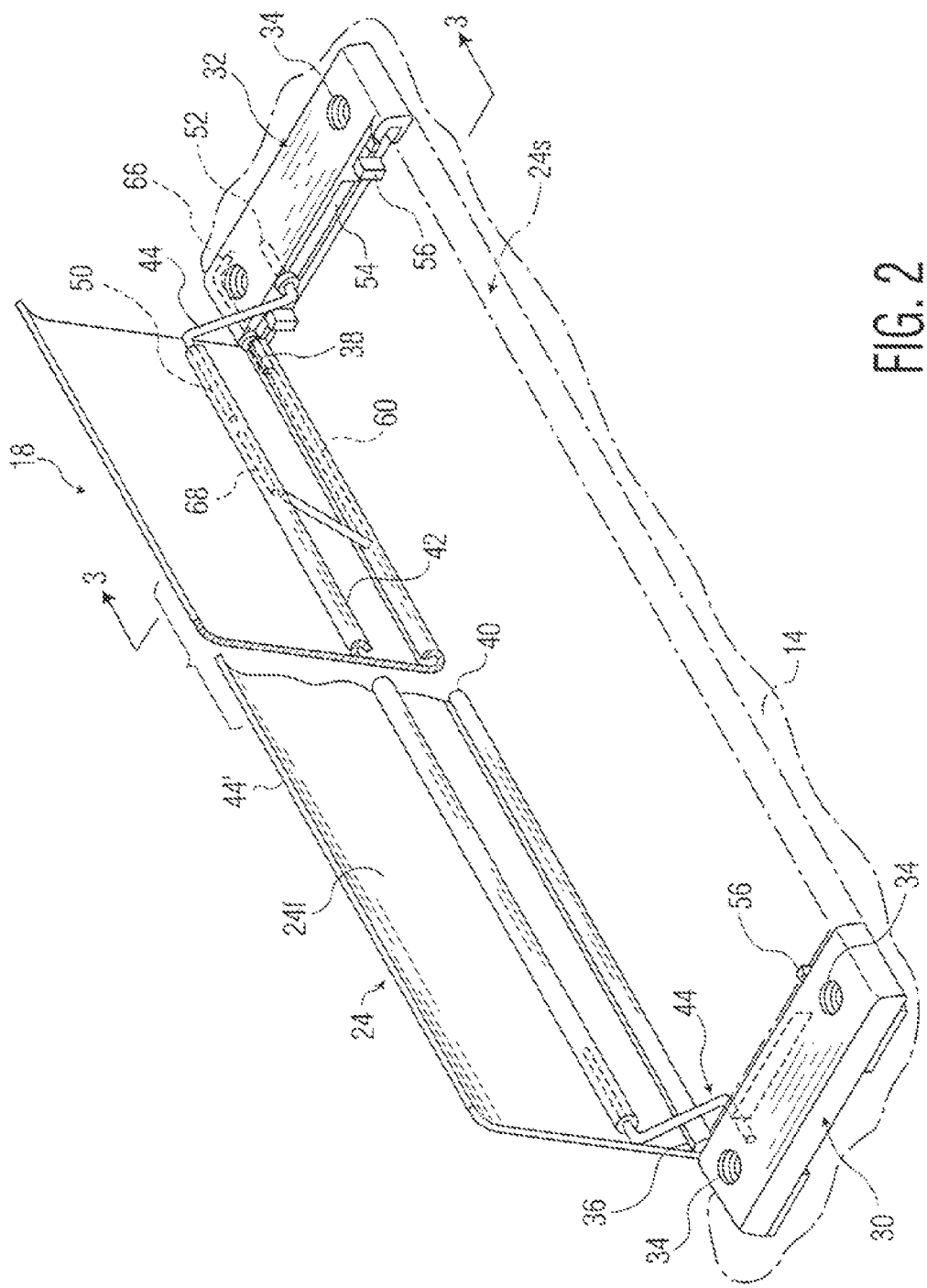
FIG. 2 is a perspective view of a deflector device of the type shown in FIG. 1, designed to be retrofitted on a motor vehicle.

Because the deflector member 18 impairs vision through the windshield somewhat, it is hinged in the front and includes an electromechanical, air-powered or hydraulically-powered device for raising it up and lowering it down. During normal travel at moderate speeds (e.g. up to about 60 MPH) the deflector member 18 remains lowered out of the way of the driver's view of the road, as is illustrated in FIG. 1B. If provided as original equipment on a vehicle, the deflector and hinge preferably accommodated in a recess 13 in the hood 12. If it is to be retrofitted onto a vehicle it can be attached to the upper surface of the hood 12 as is illustrated in FIG. 2.

The power mechanism for raising and lowering the deflector member 18 can be a windshield wiper motor, for example.

The deflector member 18 can be made of a transparent material, such as plastic, but transparency is not necessary since the member will normally be in the retracted (lowered) position.

During high-speed travel (e.g., in excess of 60 MPH on a superhighway), when the driver looks primarily far ahead down the road, the deflector member 18 is raised, either by automatic activation of a speed-dependent switch or by a manual activation of a switch by the driver. While the deflector member does somewhat impair driver's vision—it blocks the view immediately in front of the vehicle—this view is relatively unimportant in this driving condition because the driver need be interested only in what takes place far ahead down the road.

Figure 3:
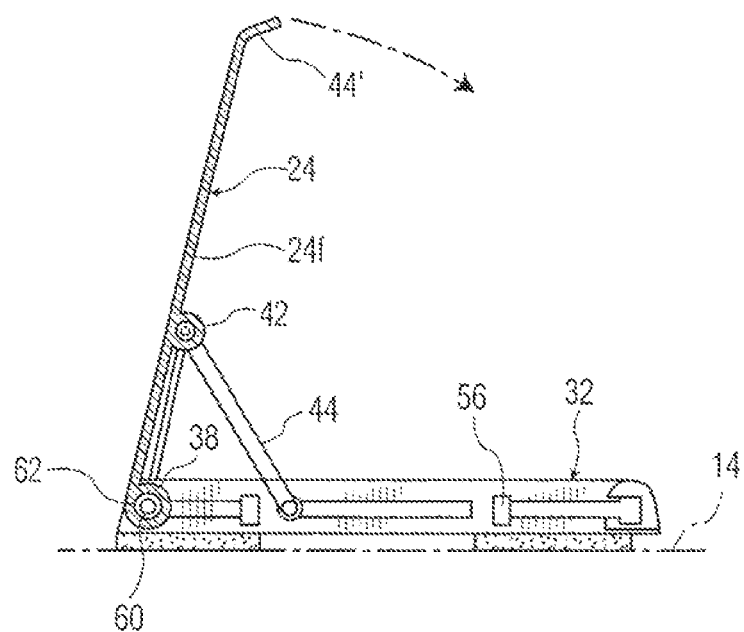
FIG. 3 is a cross-sectional view of the deflector device of FIG. 2 taken on the line 3-3.
Figure 4:
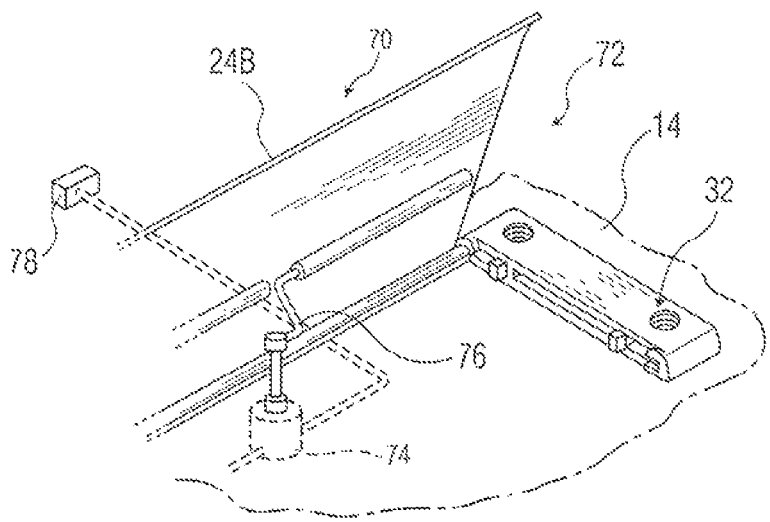
FIG. 4 is a partial perspective view of a deflector device according to another embodiment of the present invention.

As is illustrated in FIGS. 2-4, the deflector device with a deflector member 24 includes a holder formed by a pair of hold members 30, 32 at opposite ends of the deflector member 24, which mounts on the hood of a vehicle and which pivotally support the deflector member 24. Each hold member such as 30 includes a pair of screw holes 34, which receive a screw that is fastened to the hood of the vehicle, and each holder includes a roll pin 36, 38 which pivotally supports the rearward edge 40 of the deflector member. The deflector member 24 is preferably an extruded metal or plastic member of substantially constant cross-section along its length, with its rearward edge portion 40 bent into most of a circle, to pivotally receive the pins 36, 38. A middle portion of the deflector member, at 42, is also formed into most of a circle to receive an end of a Z-bar 44, as will be explained blow. The reason why the rearward edge 40 and middle portion 42 of the deflector member are formed with less than a complete circle is to permit the reception of a core therein during the extrusion process in which the deflector member 24 is formed. The forward edge 44 of the deflector member is formed to extend largely downwardly, when the rest of the sheet-like deflector member 24 is in its downward position wherein it lies substantially horizontal and flat against the hood of the vehicle.

The Z-bar 44 serves as a stop that limits backward pivoting of the deflector member 24 to the position shown in FIG. 2. The bar 44 has an outer end 50 that is pivotally received in the middle portion 42 of the deflector member, and has an inner end 52 which is slideably received in a slot 54 of one of the hold members 30, 32, the two ends being bent at a right angle with respect to the middle of the bar. When the deflector member 24 pivots up, the inner end of the Z-bar 44 abuts the rearward end wall of the slot 54, to thereby prevent any further upward or rearward pivoting of the deflector member. When the deflector member pivots down, it rests on bosses 56 of the hold members.

In order to assure that the deflector member 24 will pivot down to its storage position when the vehicle is moving at moderate speeds or stopped, a spring 60 is provided which urges the deflector member to pivot downward. The spring 60 is a spring wire with a middle portion that extends through the center of one of the pins 36 that pivotally supports the deflector member. Each of the pins 36, 38 is a roll pin (FIG. 3) that has a hole 62 along its axis. The hole in pin 38 receives the middle portion of the wire 60. An outer end 66 of the wire is bent out of line with the straight middle portion and is captured in the hold member 32. The opposite outer end 68 of the spring wire is also bent out of line with the middle portion and is captured in the middle deflector member portion 42. The spring wire tends to rotate so that the outer end portion 68 lies horizontal, and therefore tends to pivot the deflector member 24 downwardly. It is also possible to provide a weighted portion of the deflector member to pivot it downwardly, but the spring 60 provides this function in a simple and inexpensive manner.

When the vehicle is stopped or moving at moderate speeds, the deflector member 24 lies almost flush with the hood. The bent-over forward edge 44 avoids the creation of a gap and thereby provides a neat appearance. As the vehicle gains forward speed, an upward movement of air over the hood and past the windshield of the vehicle results in a lifting force on the deflector member 24. At higher speeds, such as 60 to 75 MPH, the upward lift caused by the air flowing over its upper surface overcomes the downward force of the spring mile, causing the deflector member to pivot upward. Once the deflector member is raised, it will not move down again until the vehicle speed is reduced below a lower level such as 55 MPH, thereby avoiding repeated lifting and falling of the deflector member at some critical speed.

The deflector device can be readily installed on the hood of a vehicle. Because the deflector member is flush with the hood it does not impair the driver's vision through the windshield.

The vehicle can be washed in a common mechanical car wash having a rotating horizontal brush that wipes the hood and top of the vehicle. Due to the bias of the spring 60 the deflector member will remain in its down position with its rear surface 24f flush against the hood.

The deflector device can be constructed in a simple manner, by utilizing a deflector member 24 of extruded metal or plastic. Each of the two hold members 30, 32 have identical bodies which are symmetric about their center, so that manufacture and assembly of the device is easily accomplished. A deflector device of the construction illustrated in the drawings is preferably constructed with a length of about three to six feet, to extend across the center of a vehicle hood, and with a width of from three inches to about one foot.

It is often desirable to provide a way for keeping the deflector member 24 in its down position during city driving or during driving on country roads. A simple stop can be provided to hold down the deflector member 24. If it is desired to enable unlocking as well as raising and lowering of the deflector member from within the car, then an installation of the type illustrated at 72 in FIG. 4 can be utilized. In FIG. 4, the deflector device 70 employs a vacuum cylinder 74 connected by an arm 76 to the deflector member 24, to permit raising and lowering of the deflector member 24B from within the car by means of a switch 78 under the dashboard.

The invention thus provides a deflector apparatus that permits unobstructed viewing of the region immediately in front of the vehicle when the vehicle is stopped or moving at moderate speeds and yet is effective to deflect air away from the vehicle windshield during high speed driving. In the embodiment shown in FIGS. 2 and 3, this is accomplished by means of a deflector with a pivotally mounted member that pivots upward against the force of a spring. The deflector member is raised by Bernoulli's principle applied to the air flowing over its upper surface, this upward pivoting being enhanced by mounting the deflector member close to the windshield where the largely horizontal top of the hood meets the vertically angled front of the windshield.

Figure 5:
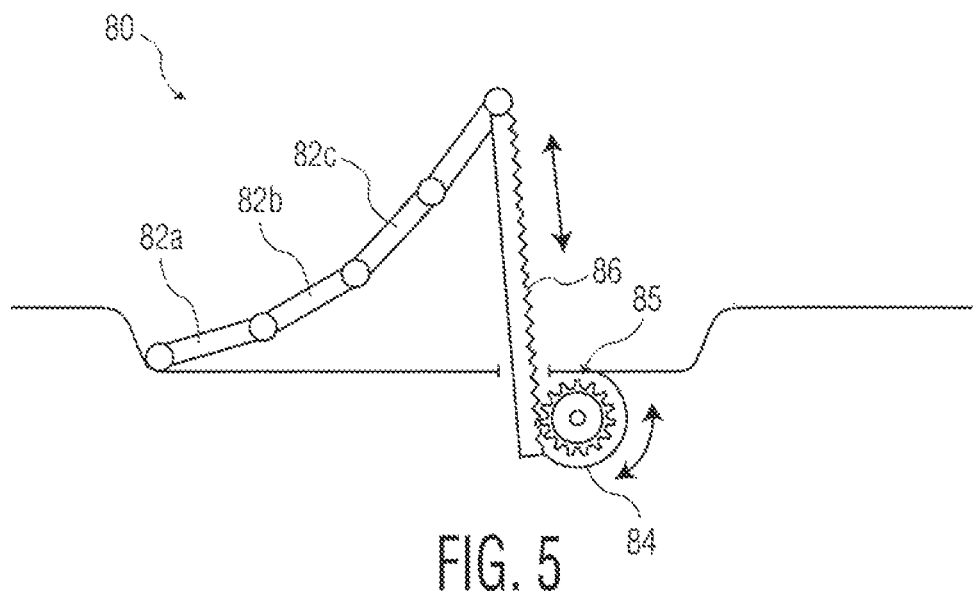
FIG. 5 is a side view of a deflector device according to yet another embodiment of the present invention.

FIG. 5 shows an articulated deflector 80 that is somewhat more streamlined than the deflectors of FIGS. 1 and 2. This device comprises an articulated deflector member 82 formed of sections 82*a*, 82*b*, 82*c*, etc., hinged together edge to edge. The rearward edge of the defector member is raised and lowered by an electric motor 84 that powers a mechanism comprised of a gear 85 and ratchet 86.

Figure 6:
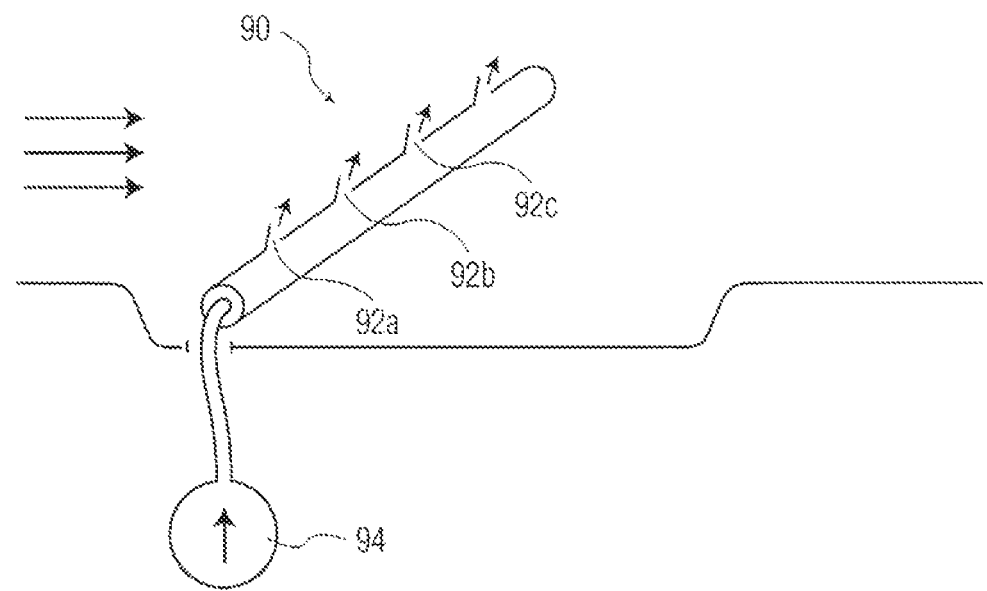
FIG. 6 is a representational diagram of a deflector device according to still another embodiment of the present invention.

FIG. 6 shows a deflector member 90 with air slots 92*a*, 92*b*, 92*c*, etc., on its front, upper surface that vent forced air driven by an air pump 94. Due to the so-called "Coanda effect" this vented air hugs the front surface of the deflector member 90 and aids in creating a smooth lateral flow of outside air over this surface.

There has thus been shown and described a novel wind deflector device for a motor vehicle which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. An air deflector device configured for mounting on a front hood of a motor vehicle adjacent a windshield for deflecting air away from the windshield as the vehicle moves forward, said deflector device comprising:
   (a) at least one elongate deflector member configured to be mounted substantially horizontally on the hood transverse to the central, longitudinal axis of the vehicle, said deflector member having a forward edge and a rearward edge when so mounted, the deflector member having an upper surface facing away from the hood when mounted thereon and at least one opening in said upper surface for the egress of air; and
   (b) an air blower and an air pipe for directing forced air to said deflector member for egress through said at least one opening, thereby creating a smooth lateral flow of air over the deflector member by means of the Coanda effect.

2. The air deflector device defined in claim 1, further comprising a hinge on the forward edge of the member and configured to be affixed to the hood to enable the rearward edge of the member to be raised and lowered in front of the windshield, and a drive mechanism connected to the deflector member and configured to raise and lower the member between a first position in which it is substantially parallel with the surface of the hood and a second position, with the rearward edge raised, in which the member deflects air upwards, away from the windshield.

3. The air deflector device defined in claim 1, further comprising a hinge on the forward edge of the member and configured to be affixed to the hood to enable the rearward edge of the member to be raised and lowered in front of the windshield, and spring means connected to the deflector member that biases the member toward the first position and allows the member to be raised by airflow over its upper surface to the second position when the vehicle travels at an elevated speed.

4. The air deflector device defined in claim 1, further comprising a motor vehicle with a front hood and a windshield and a hinge on the forward edge of the member and configured to be affixed to the hood to enable the rearward edge of the member to be raised and lowered in front of the windshield, wherein the hinge is connected to the hood of the motor vehicle in front of the windshield.

5. The air deflector device defined in claim 4, wherein the hood of the motor vehicle includes a recess and wherein said deflector member and said hinge are disposed in said recess.

6. The air deflector device defined in claim 1, further comprising a hold member disposed at each end of the deflector member and connectable to said hood for attachment of the air deflector device to the hood of a motor vehicle.

7. The air deflector device defined in claim 1, wherein the deflector member is in the range of three to six feet in length.

8. The air deflector device defined in claim 1, wherein the deflector member is in the range of three inches to one foot in width.

9. The air deflector device defined in claim 1, wherein the deflector member has a plurality of openings extending over said upper surface for the egress of air.

\* \* \* \* \*